(12) United States Patent
Northam et al.

(10) Patent No.: US 10,279,888 B2
(45) Date of Patent: May 7, 2019

(54) CONTROL SURFACE FOR AN AIRCRAFT (71) Applicant: AIRBUS OPERATIONS LIMITED, Bristol (GB)

(72) Inventors: Robert Northam, Bristol (GB); James Chu, Cheshire (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 292 days.

(21) Appl. No.: 15/223,258

(22) Filed: Jul. 29, 2016

(65) Prior Publication Data
US 2017/0029090 A1 Feb. 2, 2017

(30) Foreign Application Priority Data

Jul. 31, 2015 (GB) .................................. 1513545.2

(51) Int. Cl.
*B64C 9/02* (2006.01)
*B64C 9/00* (2006.01)
(Continued)

(52) U.S. Cl.
CPC .................. *B64C 9/02* (2013.01); *B64C 5/06* (2013.01); *B64C 9/00* (2013.01); *B64C 9/16* (2013.01);
(Continued)

(58) Field of Classification Search
CPC .... B64C 3/44; B64C 3/50; B64C 5/10; B64C 9/00; B64C 9/02; B64C 9/16; B64C 9/18; B64C 9/20; B64C 2027/8272; B64C 2027/8281; B63H 25/06; B63H 25/381; F42B 10/62; F42B 10/64
See application file for complete search history.

(56) References Cited

U.S. PATENT DOCUMENTS 1,804,520 A 5/1931 Stewart
3,677,504 A 7/1972 Schwarzler
(Continued)

FOREIGN PATENT DOCUMENTS

BE 438541 4/1940
DE 1 506 615 8/1969
(Continued)

OTHER PUBLICATIONS

UKIPO Search Report dated Jan. 25, 2016 Great Britain Application No. 1513545.2.

*Primary Examiner* — Nicholas McFall
(74) *Attorney, Agent, or Firm* — Nixon & Vanderhye P.C.

(57) ABSTRACT

The present application relates to a control surface for an aircraft. The control surface has a leading edge, a trailing edge, and a chord-line defined between the leading edge and the trailing edge. A first aerodynamic surface is between the leading and trailing edges and a second surface is between the leading and trailing edges. The leading edge is formed by a nose, the nose having a hinge axis about which the control surface is deflectable. A maximum thickness of the control surface perpendicular to the chord-line between the first aerodynamic surface and the second surface is located aft of the hinge axis. The present application also relates to a control surface for an aircraft having a maximum curvature of the first aerodynamic surface of the control surface located aft of the hinge axis. The present application also relates to an aircraft or part of an aircraft comprising a fixed section and a control surface.

22 Claims, 4 Drawing Sheets

(51) Int. Cl.
  *B64C 9/18* (2006.01)
  *B64C 9/16* (2006.01)
  *B64C 5/06* (2006.01)
  *B64C 21/00* (2006.01)

(52) U.S. Cl.
  CPC ............... *B64C 9/18* (2013.01); *B64C 21/00* (2013.01); *B64C 2009/005* (2013.01)

(56) References Cited

U.S. PATENT DOCUMENTS

| | | |
|---|---|---|
| 3,921,942 A | 11/1975 | Bracka |
| 5,110,072 A | 5/1992 | Owl et al. |
| 2005/0116094 A1 | 6/2005 | Pauly |
| 2012/0043428 A1 | 2/2012 | Goelling et al. |

FOREIGN PATENT DOCUMENTS

| | | |
|---|---|---|
| EP | 0 469 910 | 2/1992 |
| GB | 520962 A | 5/1940 |
| GB | 559810 A | 3/1944 |
| WO | 97/32779 | 9/1997 |

CONTROL SURFACE FOR AN AIRCRAFT

RELATED APPLICATIONS

The present application claims priority from Great Britain Application Number 1513545.2, filed Jul. 31, 2015, the disclosure of which is hereby incorporated by reference herein in its entirety.

FIELD OF THE INVENTION

The present invention relates to a control surface for an aircraft. The present invention also relates to an aircraft or part of an aircraft comprising a control surface.

BACKGROUND OF THE INVENTION

Movable control surfaces of an aircraft, such as a rudder, are generally hingably mounted to a fixed section, for example a rudder is hingably mounted to a vertical fin of a vertical tail plane. Such a movable control surface typically deflects about a hinge axis extending along the fixed section. The control surfaces generally extend from a trailing edge of a fixed surface, such as a wing or stabiliser. A conventional control surface is deflectable about their mounting.

Figure 3:
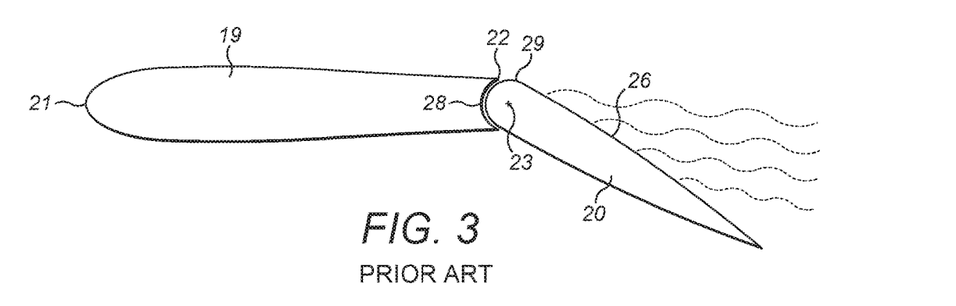
FIG. 3 illustrates a cross-sectional profile view of the conventional arrangement of the lifting surface shown in FIG. 2 with the control surface in a deflected position.

Boundary layer separation is a phenomenon shown in FIG. 3 in which the boundary layer peels away from a solid surface 26 of an aircraft aerofoil as the result of an adverse pressure gradient opposing the flow along it. When the boundary layer separates, as shown by dashed lines in FIG. 3, the lifting efficiency of the surface drops. For example, if when the angle of the wing increases relative to the airflow, significant areas of separation occurs, the drag increases dramatically, and the aircraft is said to stall.

Boundary layer separation control is therefore very important for aircraft. One consequence of a high deflection angle of a control surface about its deflection axis is that a section of the nose of the control surface becomes exposed at the boundary of the control surface and the fixed section from which the control surface extends. Due to the curvature of the control surface nose becoming exposed to the air flow, significant boundary layer separation may occur.

If the flow separation at high angles of deflection of the control surface could be controlled, then the performance of the aircraft would be improved.

SUMMARY OF THE INVENTION

According to one aspect of the invention, there is provided a control surface for an aircraft comprising a leading edge, a trailing edge, and a chord-line defined between the leading edge and the trailing edge, a first aerodynamic surface between the leading and trailing edges, a second surface between the leading and trailing edges, the leading edge being formed by a nose, the nose having a hinge axis about which the control surface is deflectable, the first aerodynamic surface having an exposed airflow surface and the nose comprising an arced nose profile section extending from the exposed airflow surface wherein the arced nose profile section is configured to be at least partially exposable to airflow flowing over the control surface, wherein a maximum thickness of the control surface perpendicular to the chord-line between the first aerodynamic surface and the second surface is located aft of the hinge axis, and a radius of the arced nose profile section is greater than a perpendicular distance between the chord-line and the point of maximum thickness of the control surface on the first aerodynamic surface.

With this arrangement it is possible to minimise boundary layer separation the retention of the boundary layer over the control surface by reducing the curvature of the nose portion which may be exposed to airflow over the control surface.

The second surface may be a second aerodynamic surface.

The centre of curvature of the profile of the nose may be offset from the hinge axis.

The profile of the nose profile section may be non-radial about the hinge axis.

The nose profile section may define a circular arc.

The exposed airflow surface and the nose profile section of the first aerodynamic surface may be first exposed airflow surface and first nose profile section, and the second surface may comprise a second exposed airflow section and a second nose profile section extending from the second exposed airflow. The second nose profile section may be configured to be at least partially exposable to airflow flowing over the control surface.

By providing such an arrangement it is possible to delay and minimise boundary layer separation irrespective of the direction of deflection of the control surface.

The profile of the second nose profile section may be non-radial about the hinge axis.

The curvature of the first nose profile section may differ from the curvature of the second nose profile section.

The centre of curvature of the first nose profile section may differ from the centre of curvature of the second nose profile section.

The first aerodynamic surface and the second surface may be symmetrical with each other about the chord-line.

The control surface may be a rudder. The control surface may be an aileron. The control surface may be an elevator. The control surface may be an elevon. The control surface may be a flaperon.

A maximum curvature of the first aerodynamic surface of the control surface may be located aft of the hinge axis.

According to one aspect of the invention, there is provided a control surface for an aircraft comprising a leading edge, a trailing edge, an aerodynamic surface between the leading edge and the trailing edge, the leading edge being formed by a nose, the nose having a hinge axis about which the control surface is deflectable, wherein a maximum curvature of the aerodynamic surface of the control surface is located aft of the hinge axis.

According to one aspect of the invention, there is provided a part of an aircraft comprising a fixed section and the control surface according to one of the aspects described above, wherein the control surface is deflectable relative to the fixed section about the hinge axis.

The position of the hinge axis may be fixed. That is, the position of the hinge axis is not variable relative to the fixed section.

The nose may be at least partially received by the section and a boundary edge of the fixed section may overlap the nose.

The maximum thickness of the control surface perpendicular to the chord-line between the first aerodynamic surface and the second surface may be located aft of the boundary edge when the control surface is in an undeflected position.

The first aerodynamic surface and the second surface may converge towards a juncture with the boundary edge.

An indent may be defined at the juncture of the fixed section and the first aerodynamic surface when the control surface is in an undeflected position.

The nose profile section may be extendable from the boundary edge of the fixed section to be exposed to airflow flowing over the control surface.

The fixed section may comprise a fixed exposed airflow surface extending to the boundary edge, and the plane of the profile section of the nose may be substantially aligned with the plane of the fixed exposed airflow surface when the control surface is in a fully deflected position.

The boundary edge may comprise a seal configured to abut the nose profile section.

According to one aspect of the invention, there is provided an aircraft comprising a control surface or a part of an aircraft according to one of the aspects described above.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
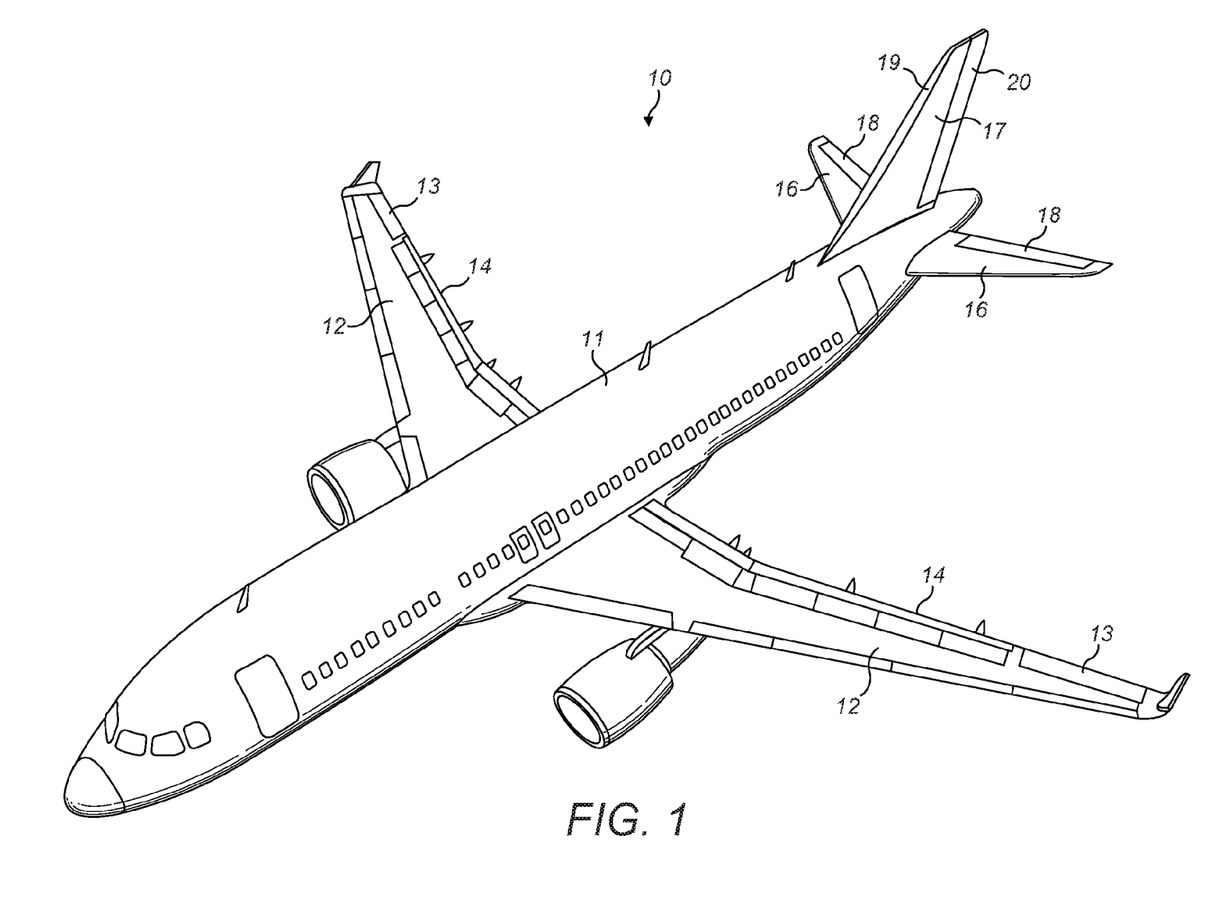
FIG. 1 illustrates a fixed-wing aircraft with a rudder, elevators and ailerons.

A fixed wing aircraft 10 is shown in FIG. 1. The aircraft 10 includes a fuselage 11. Two wings 12, acting as lifting surfaces, extend from the fuselage 11. It will be appreciated that lifting surfaces may take a variety of different planform shapes and profiles depending on the particular application. Each wing 12 has an aileron 13, forming a control surface, at its trailing edge 14. Proximate an aft end 15 of the aircraft 10 are two horizontal tail planes 16 and a vertical tail plane 17. Each horizontal tail plane 16 has an elevator 18, forming a control surface, at its trailing edge. The vertical tail plane 17 comprises a vertical fin 19 and a rudder 20.

Figure 2:
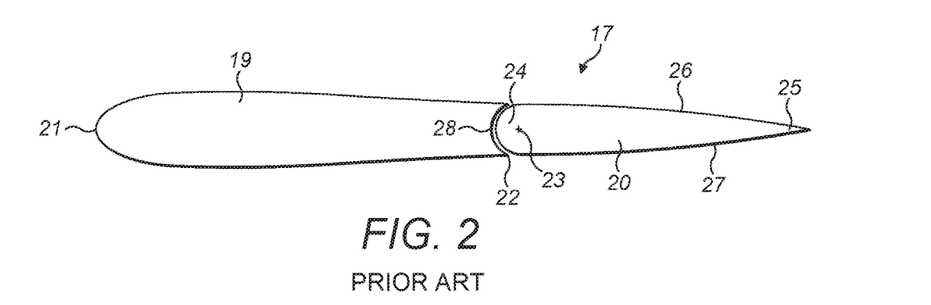
FIG. 2 illustrates a cross-sectional profile view of a conventional arrangement of a lifting surface with a control surface in an undeflected position.

A schematic cross-sectional profile view of a known arrangement of the vertical tail plane 17 defined midway along the spanwise length of the vertical tail plane 17 is shown in FIGS. 2 and 3. The vertical fin 19 is a fixed section with a fin leading edge 21 and a boundary edge 22. At the boundary edge 22 is the rudder 20. The rudder 20 acts as a control surface. The rudder 20 extends substantially the span length of the vertical fin 19. FIGS. 2 and 3 show schematic cross-sectional profile views of the rudder 20 defined midway along the spanwise length of the vertical tail plane 17.

The rudder 20 is hingable about the vertical fin 19. The rudder 20 is pivotably mounted to pivot about a hinge axis 23 extending through the rudder 20. The rudder 20 has a nose 24 and a tail 25. The nose 24 defines the leading end of the rudder 20. The tail 25 defines the trailing end of the rudder 20. The hinge axis 23 is defined between the leading end and the trailing end of the rudder 20. The rudder 20 converges between the nose 24 and the tail 25. That is, opposing first and second exposed surfaces 26, 27 converge towards each other from the nose 24 to the tail 25.

The profile shape of the nose 24 of the rudder 20 defines a circular arc. The profile of the nose is radial about the hinge axis. That is, the profile shape of the nose 24 extends uniformly about the hinge axis 23 of the rudder 20.

The rudder 20, acting as a control surface, has a leading edge and a trailing edge. A chord-line is defined between the leading edge and the trailing edge.

The vertical fin 19 has a nose-receiving recess 28. The nose-receiving recess 28 is at the fin trailing edge 22. The nose 24 of the rudder 20 is received in the nose-receiving recess 28. The boundary edge 22 overlaps the rudder 20. The boundary edge 22 overlaps the nose 24 of the rudder 20. The radial profile of the nose 24 is sheltered from the airflow when the rudder 20 is in its neutral, undeflected position, as shown in FIG. 2. That is, the vertical fin 19 is co-planar with the rudder 20. Therefore, the radial profile of the nose 24 is not exposed to airflow over the vertical tail plane 17 when the rudder 20 is in its neutral, undeflected position.

The rudder 20 is deflectable about the hinge between the neutral, undeflected position, as shown in FIG. 2, and a deflected position, as shown in FIG. 3. In FIG. 3, the rudder 20 is shown fully deflected, however it will be understood that the rudder 20 is deflectable into other intermediate deflected positions. In FIG. 3, the rudder 20 is shown deflected in a first direction (in this case, in a clockwise direction), however it will be understood that the rudder 20 is also deflectable in a second direction (in this case, in an anti-clockwise direction).

When the rudder 20 is moved into a deflected position, as shown in FIG. 3, a section 29 of the radial profile of the nose 24 is exposed to airflow over the vertical tail plane 17. The radial profile of the nose 24 helps to maintain a substantially continuous exposed airflow surface of the vertical tail plane 17 throughout the range of deflection of the rudder 20. That is, the formation of peaks or troughs are prevented. As the exposed section of the radial profile of the nose 24 has a circular arc of a low radius of curvature relative to the remainder of the rudder 20, the onset of flow separation is promoted when the rudder 20 is in a deflected position.

Figure 4:
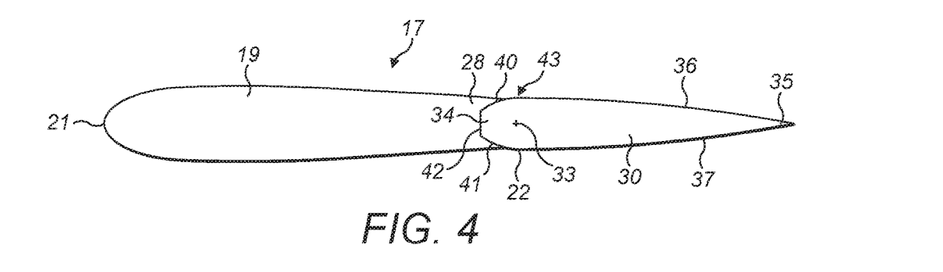
FIG. 4 illustrates a schematic cross-sectional profile view of an arrangement of a lifting surface with a control surface in an undeflected position according to one embodiment of the present invention.
Figure 5:
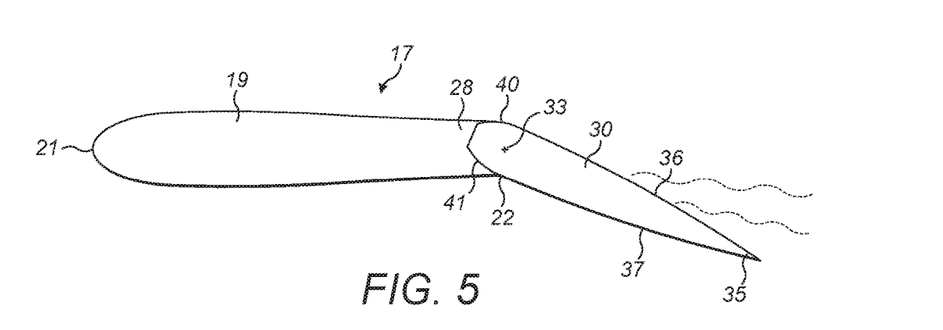
FIG. 5 illustrates a schematic cross-sectional profile view of the arrangement of the lifting surface shown in FIG. 4 with the control surface in a deflected position.

Referring now to FIGS. 4 and 5, an embodiment is shown of a vertical tail plane 17 having a rudder 30 acting as a control surface according to the present invention. The features and components are generally the same as those of the conventional arrangement of the vertical tail plane 17 described above, and so a detailed description will be omitted herein.

FIGS. 4 and 5 show schematic cross-sectional profile views of the rudder defined midway along the spanwise length of the vertical tail plane 17. In FIG. 4 the rudder 30 is in its neutral, undeflected position with respect to the vertical fin 19. In FIG. 5 the rudder 30 is in a deflected position with respect to the vertical fin.

The rudder 30 acts as the control surface. The vertical fin 19 acts as the fixed section. In the present embodiment, the rudder 30 extends substantially the span length of the vertical fin 19.

The rudder 30 is hingable about the vertical fin 19. The rudder 30 is pivotably mounted to pivot about a hinge axis 33 extending through the rudder 30. The rudder 30 has a nose 34 and a tail 35. The nose 34 defines the leading end of the rudder 30. The tail 35 defines the trailing end of the rudder 30. The hinge axis 33 is defined between the leading end and the trailing end of the rudder 30. The rudder 20 converges between the nose 34 and the tail 35. That is, opposing first and second exposed surfaces 36, 37 converge towards each other from the nose 34 to the tail 35.

The nose 34 extends from the first and second exposed surfaces 36, 37. The profile of the nose 34 does not define a uniform circular arc. That is, the profile of the nose is non-radial about the hinge axis 33. The profile of the nose 34 comprises a first profile section 40 and a second profile section 41. The nose 34 has a front end 42. The front end 42 is a planar face in the present embodiment defining a blunt end, however other shapes of the front end 42 are possible. The front end 42 extends between the first and second profile sections 40, 41.

The first profile section 40 has profile shape which is non-radial about the hinge axis 33 of the nose 34. That is, the profile shape of the first profile section 40 extends non-uniformly about the hinge axis 33. The first profile section 40 is arcuate. The first profile section 40 has a centre of curvature which is offset from the hinge axis 33. The radius of curvature of the first profile section 40 is greater than the distance between the first profile section 40 and the hinge axis 33.

The first profile section 40 extends from the first exposed surface 36. The radius of curvature of the first profile section 40 may vary along the span length of the rudder 30.

The second profile section 41 has profile shape which is non-radial about the hinge axis of the nose 34. That is, the profile shape of the second profile section 41 extends non-uniformly about the hinge axis 33. The second profile section 41 is arcuate. The second profile section 41 has a centre of curvature which is offset from the hinge axis 33. The radius of curvature of the second profile section 41 is greater than the distance between the second profile section 41 and the hinge axis 33.

The second profile section 41 extends from the second exposed surface 37. The radius of curvature of the second profile section 41 may vary along the span length of the rudder 30. The centre of curvature of the second profile section 41 is offset from the centre of curvature of the first profile section 40.

The second profile section 41 extends from the second exposed surface 37. The radius of curvature of the second profile section 41 may vary along the span length of the rudder 30.

The first and second profile sections 40, 41 of the nose 34 are symmetrical about the chord-line of the rudder 30. The first and second profile sections 40, 41 have a uniform radius of curvature.

The vertical fin 19 has a nose-receiving recess 28. The nose-receiving recess 28 is at the fin trailing edge 22. The nose 34 of the rudder 30 is received in the nose-receiving recess 28. The boundary edge 22 overlaps the rudder 30. The boundary edge 22 overlaps the nose 34 of the rudder 30. The nose 34 is sheltered from the airflow when the rudder 30 is in its neutral, undeflected position, as shown in FIG. 4. That is, the vertical fin 19 is co-planar with the rudder 30.

The first profile section 40 of the nose 34 is not exposed to airflow over the vertical tail plane 17 when the rudder 30 is in its neutral, undeflected position. That is, the boundary edge 22 of the vertical fin 19 overlaps the first profile section 40.

The second profile section 41 of the nose 34 is not exposed to airflow over the vertical tail plane 17 when the rudder 30 is in its neutral, undeflected position. That is, the boundary edge 22 of the vertical fin 19 overlaps the second profile section 41.

When the rudder 30 is in its neutral, undeflected position, an indent in the overall exposed surface profile of the vertical tail plane 17 is formed between the boundary edge 22 of the vertical fin 19 and the rudder 30. The indent 43 is defined by profiling a boundary region immediately forward of the boundary edge 22 such that, when the rudder 30 is in the fully deflected position, the profile section of the nose exposed to airflow forms a continuous arc of low curvature with the boundary region. That is, the boundary region has a low radius of curvature relative to the adjacent surface region of the vertical fin 19. The section of the rudder 30 forming the indent 43 is in the flow shadow formed by the boundary region and so is not exposed to airflow.

It has been surprisingly found that the elongate indent resulting from the provision of a non-radial profile of the nose does not result in a notable increase in drag over a conventional radial nose profile.

In one embodiment the boundary edge 22 of the vertical fin 19 extends to or beyond the edge of the first and second profile sections 40, 41.

It will be understood that the boundary edge 22 has a sealing arrangement between the vertical fin 19 and the rudder 30.

The rudder 30 is deflectable about the hinge between the neutral, undeflected position, as shown in FIG. 4, and a first deflected position, as shown in FIG. 5. In FIG. 5, the rudder 30 is shown fully deflected, however it will be understood that the rudder 30 is deflectable relative to the vertical fin 19 into other intermediate deflected positions. In FIG. 5, the rudder 30 is shown deflected about the vertical fin 19 in a first direction (in this case, in a clockwise direction), however it will be understood that the rudder 30 is also deflectable relative to the vertical fin 19 in a second direction (in this case, in an anti-clockwise direction).

When the rudder 30 is moved into the first deflected position, as shown in FIG. 5, the first profile section 40 of the nose 34 is exposed to airflow over the vertical tail plane 17. The first profile section 40 of the nose 34 which is exposable to airflow and the first exposed surface 36 together define a first aerodynamic surface. The radial profile of the first profile section 40 of the nose 34 has a greater radius of curvature than that of a nose having a radial profile (as shown in FIGS. 2 and 3). Therefore, the profile of the first profile section 40 provides for a substantially continuous exposed airflow surface of the vertical tail plane 17 having a low curvature throughout the range of deflection of the rudder 30. That is, the level of curvature at the boundary between the rudder 30 and the vertical fin 19 is minimised. As the exposed section of the profile of the nose 34 has an arc having a low curvature, the onset of flow separation is postponed when the rudder 30 is in a deflected position.

When the rudder 30 is moved into the second deflected position, the second profile section 41 of the nose 34 is exposed to airflow over the vertical tail plane 17. The second profile section 41 of the nose 34 which is exposable to airflow and the second exposed surface 37 together define a second aerodynamic surface. The radial profile of the second profile section 41 of the nose 34 has a greater radius of curvature than that of a nose having a radial profile (as shown in FIGS. 2 and 3). Therefore, the profile of the second profile section 41 provides for a substantially continuous exposed airflow surface of the vertical tail plane 17 having a low curvature throughout the range of deflection of the rudder 30. That is, the level of curvature at the boundary between the rudder 30 and the vertical fin 19 is minimised. As the exposed section of the profile of the nose 34 has an arc having a low curvature, the onset of flow separation is postponed when the rudder 30 is in a deflected position.

The rudder 30 has a maximum thickness perpendicular to the chord-line between the first and second aerodynamic surfaces. The maximum thickness of the rudder 30 is located aft of the hinge axis. That is, the maximum thickness of the rudder 30 perpendicular to the chord-line between the first and second aerodynamic surfaces is between the hinge line and the trailing edge of the rudder 30.

When the rudder 30 is in the undeflected position the maximum thickness of the rudder 30 perpendicular to the chord-line between the first and second aerodynamic surfaces is located aft of the boundary edge 22 of the vertical fin 19. The maximum thickness of the rudder 30 perpendicular to the chord-line between the first and second aerodynamic surfaces is exposed to the airflow in the undeflected position. The first and second aerodynamic surfaces converge from the maximum thickness of the rudder 30 to the boundary edge 22 of the vertical fin 19.

In the above described embodiment the first and second profile sections 40, 41 of the nose 34 are symmetrical about the chord-line of the control surface, in this case, the rudder 30. However, it will be understood that, in alternative embodiments, the first and second profile sections of the nose is asymmetrical about the chord-line of the control surface. In such an arrangement the desired angle of deflection in one direction may differ from the desired angle of deflection in the other direction.

Figure 6:
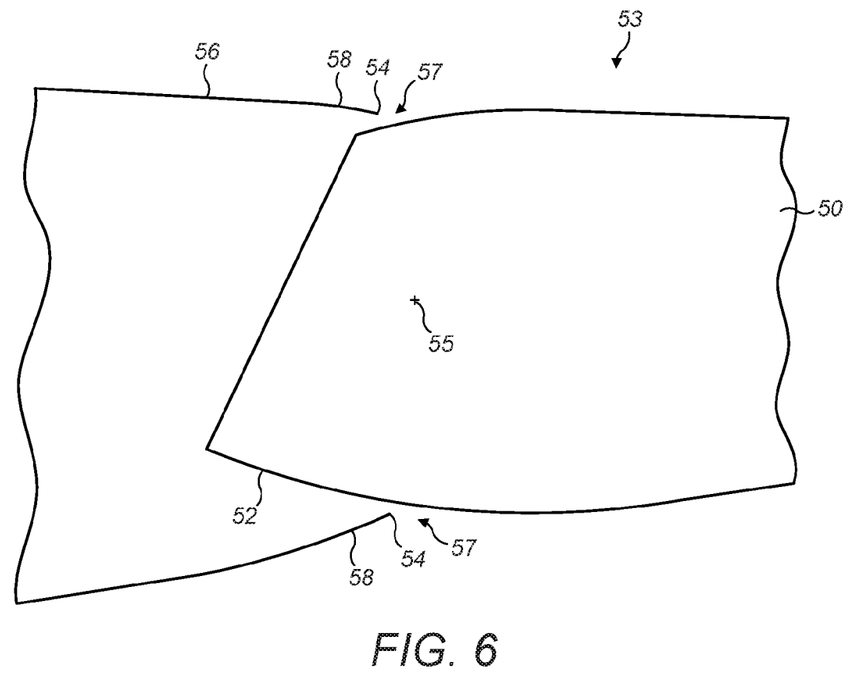
FIG. 6 illustrates a schematic cross-sectional profile view of an arrangement of a lifting surface with a control surface in an undeflected position according to another embodiment of the present invention.
Figure 7:
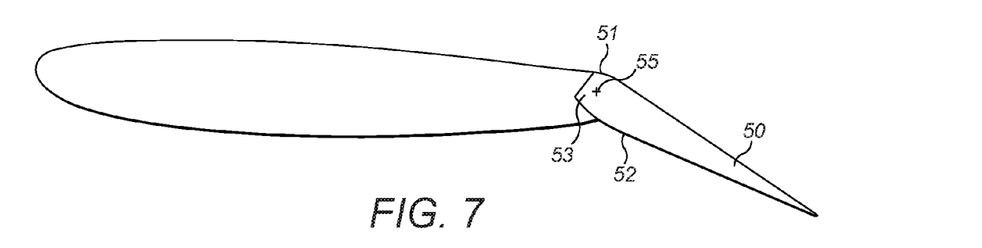
FIG. 7 illustrates a schematic cross-sectional profile view of the arrangement of the lifting surface shown in FIG. 6 with the control surface in a first deflected position.
Figure 8:
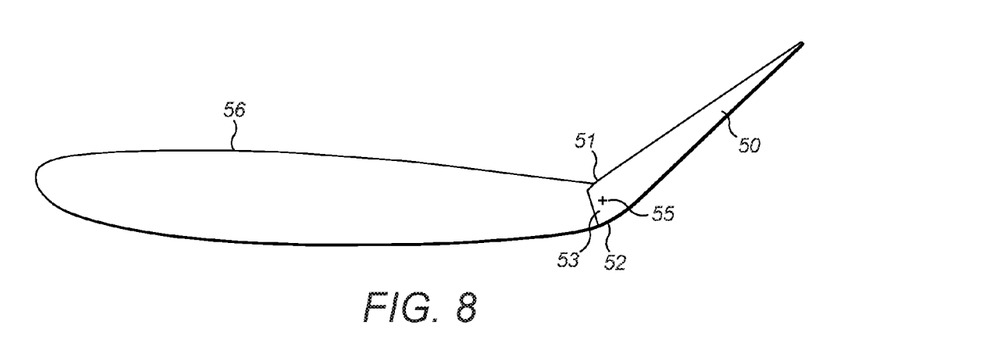
FIG. 8 illustrates a schematic cross-sectional profile view of the arrangement of the lifting surface shown in FIG. 6 with the control surface in a second deflected position.

Referring now to FIGS. 6 to 8, an alternative embodiment of a control surface 50 is shown. The configuration of this embodiment of a control surface is generally the same as the configuration of the embodiments described above with reference to FIGS. 4 and 5, and so a detailed description will be omitted herein. In this embodiment, first and second profile sections 51, 52 of a nose 53 is asymmetrical about the chord-line of the control surface 50. Such a configuration is useful for control surfaces for which the desired angle of deflection in one direction differs from the desired angle of deflection in the other direction. Such control surfaces include an aileron, an elevator or an elevon. The control surface in the present embodiment is a wing 56. The wing 56 has a boundary edge 54. An indent 57 is defined by profiling a boundary region 58 immediately forward of the boundary edge 54. That is, the boundary region 58 has a low radius of curvature relative to the adjacent surface region of the wing 56. Therefore, when the rudder 50 is in the fully deflected position, the profile section of the nose 53 exposed to airflow, i.e. one of the first and second profile sections 51, 52 of a nose 53, forms a continuous arc of low curvature with the boundary region 58. The boundary edge 58 may be formed from a rigid section or a flexible section.

In this embodiment, the centre of curvature of the first profile section 51 is offset from the centre of curvature of the second profile section 52. The centre of curvature of the first and second profile sections are offset from a hinge axis 55 of the control surface 50.

The radius of curvature of the first profile section 51 differs from the radius of curvature of the second profile section 52. The radius of curvature of the second profile section 52 is greater that the radius of curvature of the first profile section 51.

As shown in FIG. 7, when the control surface 50 is moved into a first deflected position, the first profile section 51 of the nose 53 is exposed to airflow as it becomes exposed past the boundary edge 54. The radial profile of the first profile section 51 of the nose 53 has a greater radius of curvature than that of a nose having a radial profile (as shown in FIGS. 2 and 3). Therefore, the profile of the first profile section 51 provides for a substantially continuous exposed airflow surface having a low curvature throughout the range of deflection of the control surface 50. As the exposed section of the nose 53 has an arc having a low curvature, the onset of flow separation is delayed and minimised.

As shown in FIG. 8, when the control surface 50 is moved into the second deflected position, the second profile section 52 is exposed to airflow. As the exposed part of the second profile section 52 has an arc having a low curvature, the onset of flow separation is postponed when the rudder 20 is in the second deflected position. By providing an asymmetric nose arrangement as described above it is possible to maximise the efficiency of the control surface 50 having different deflection requirements in different directions.

The provision of asymmetric first and second profile sections 51, 52 also provides for a control surface having an asymmetric cross-sectional profile shape.

Although a blunt planar front end of the nose is shown and described above, it will be understood that the shape of the front end of the nose not forming the or each profile section of the nose may differ. The front end of the nose have an arced profile, or another profile shape.

It will be understood that the fixed section may itself be a movable surface, such as a moveable tailplane. Fixed section is defined as a body about which a control surface is hinged. Therefore, the fixed section about which a control surface is hinged may itself be a movable surface.

Although embodiments of a control surface have been described above with reference to a rudder, it will be appreciated that the above described invention is applicable to other control surfaces, for example an aileron, an elevator, an elevon, or a tab. Such control surfaces are pivotable about a hinge axis.

Although in the above described embodiments the control surface is deflectable in both first and second directions, it will be understood that in alternative embodiments the control surface is deflectable in one direction only. In such an embodiment, the section of the nose which is non-radial about the hinge axis is formed on one side of the nose only. The other side of the nose may be radial about the hinge axis. In an alternative embodiment, the control surface is deflectable from its neutral position in two directions, with the section of the nose which is non-radial about the hinge axis being formed on one side of the nose only. The other side of the nose is radial about the hinge axis.

It will be understood that the configuration of the aircraft 10, in particular the configuration of the lifting and control surfaces may differ. For example, the horizontal tail planes 16 may be omitted and the lifting surfaces may have elevons (not shown).

Although the invention has been described above with reference to one or more preferred embodiments, it will be appreciated that various changes or modifications may be made without departing from the scope of the invention as defined in the appended claims.

The invention claimed is:

1. A control surface for an aircraft comprising
a leading edge, a trailing edge, and a chord-line defined between the leading edge and the trailing edge,
a first aerodynamic surface between the leading and trailing edges,
a second surface between the leading and trailing edges,
the leading edge being formed by a nose, the nose having a hinge axis about which the control surface is deflectable,
the first aerodynamic surface having an exposed airflow surface and the nose comprising an arced nose profile section extending from the exposed airflow surface,
wherein the arced nose profile section is configured to be at least partially exposable to airflow flowing over the control surface,
wherein a maximum thickness of the control surface, perpendicular to the chord-line between the first aerodynamic surface and the second surface, is located aft of the hinge axis, and
wherein a radius of the arced nose profile section is greater than a perpendicular distance between the chord-line and the point of maximum thickness of the control surface on the first aerodynamic surface.

2. The control surface according to claim 1, wherein the second surface between the leading and trailing edges is a second aerodynamic surface.

3. The control surface according to claim 1, wherein the centre of curvature of the profile of the nose is offset from the hinge axis.

4. The control surface according to claim 1, wherein the profile of the arced nose profile section is non-radial about the hinge axis.

5. The control surface according to claim 4, wherein the arced nose profile section defines a circular arc.

6. The control surface according to claim 3, wherein the exposed airflow surface and the arced nose profile section of the first aerodynamic surface are a first exposed airflow surface and a first nose profile section, the second surface comprising a second exposed airflow section and a second nose profile section extending from the second exposed airflow, wherein the second nose profile section is configured to be at least partially exposable to airflow flowing over the control surface.

7. The control surface according to claim 6, wherein the profile of the second nose profile section is non-radial about the hinge axis.

8. The control surface according to claim 6, wherein the curvature of the first nose profile section differs from the curvature of the second nose profile section.

9. The control surface according to claim 8, wherein the centre of curvature of the first nose profile section differs from the centre of curvature of the second nose profile section.

10. The control surface according to claim 1, wherein the first aerodynamic surface and the second surface are symmetrical with each other about the chord-line.

11. The control surface according to claim 1, wherein the control surface is one of a rudder, an aileron, an elevator or an elevon.

12. The control surface according to claim 1, wherein a maximum curvature of the first aerodynamic surface of the control surface is located aft of the hinge axis.

13. A part of an aircraft comprising a fixed section and the control surface according to claim 1, wherein the control surface is deflectable relative to the fixed section about the hinge axis.

14. The part of the aircraft according to claim 13, wherein the nose is at least partially received by the fixed section and a boundary edge of the fixed section overlaps the nose.

15. The part of the aircraft according to claim 14, wherein the maximum thickness of the control surface perpendicular to the chord-line between the first aerodynamic surface and the second surface is located aft of the boundary edge when the control surface is in an undeflected position.

16. The part of the aircraft according to claim 14, wherein the first aerodynamic surface and the second surface converge towards a juncture with the boundary edge.

17. The part of the aircraft according to claim 15, wherein an indent is defined at the juncture of the fixed section and the first aerodynamic surface when the control surface is in an undeflected position.

18. The part of the aircraft according to claim 14, wherein the arced nose profile section is extendable from the boundary edge of the fixed section to be exposed to airflow flowing over the control surface.

19. The part of the aircraft according to claim 14, wherein the fixed section comprises a fixed exposed airflow surface extending to the boundary edge, the plane of the profile section of the nose being substantially aligned with the plane of the fixed exposed airflow surface when the control surface is in a fully deflected position.

20. The part of the aircraft according to claim 14, wherein the boundary edge comprises a seal configured to abut the arced nose profile section.

21. An aircraft comprising a control surface or a part of an aircraft according to claim 1.

22. A part of an aircraft, comprising:
a fixed section and a control surface deflectable relative to the fixed section for an aircraft,
wherein the control surface comprises:
a leading edge, a trailing edge, and a chord-line defined between the leading edge and the trailing edge,
a first aerodynamic surface between the leading and trailing edges,
a second surface between the leading and trailing edges,
the leading edge being formed by a nose, the nose having a hinge axis extending through the control surface about which the control surface is deflectable relative to the fixed section,
the first aerodynamic surface having an exposed airflow surface and the nose comprising an arced nose profile section extending from the exposed airflow surface wherein the arced nose profile section is configured to be at least partially exposable to airflow flowing over the control surface,
wherein a maximum thickness of the control surface, perpendicular to the chord-line between the first aerodynamic surface and the second surface, is located aft of the hinge axis, and
a radius of the arced nose profile section is greater than a perpendicular distance between the chord-line and the point of maximum thickness of the control surface on the first aerodynamic surface, and
the nose is at least partially received by the fixed section,
wherein the fixed section comprises:
a boundary edge overlapping the nose, and
a boundary region immediately forward of the boundary edge,
wherein an indent is defined by profiling the boundary region at a juncture of the fixed section and the first aerodynamic surface at the boundary edge when the control surface is in an undeflected position.

\* \* \* \* \*